G. T. BREWER.

Plow.

No. 70,159

Patented Oct. 29, 1867.

WITNESSES:
S. M. Randolph
Chas. H. Boyle

INVENTOR
G. T. Brewer
By his Atty's
M. Randolph & Co

N. PETERS, PHOTO-LITHOGRAPHER, WASHINGTON, D. C.

United States Patent Office.

GEORGE T. BREWER, OF PRAIRIE DU ROCHER, ILLINOIS.

Letters Patent No. 70,159, dated October 29, 1867; antedated October 19, 1867.

GANG-PLOUGHS.

The Schedule referred to in these Letters Patent and making part of the same.

TO ALL WHOM IT MAY CONCERN:

Be it known that I, GEORGE T. BREWER, of Prairie du Rocher, in the county of Randolph, and State of Illinois, have invented a new and useful improvement in Gang-Ploughs; and I do hereby declare that the following is a full and clear description thereof, reference being had to the accompanying drawings, and to the letters of reference marked thereon.

This invention relates to the combination and arrangement of three ploughs upon a single beam, in such a manner as to turn three separate furrows at one and the same time, and the parts being so constructed as to dispense with all wheels and gearing usually incident to gang-ploughs To enable those skilled in the art to make and use my improved plough, I will proceed to describe its construction and operation.

Figure 1:
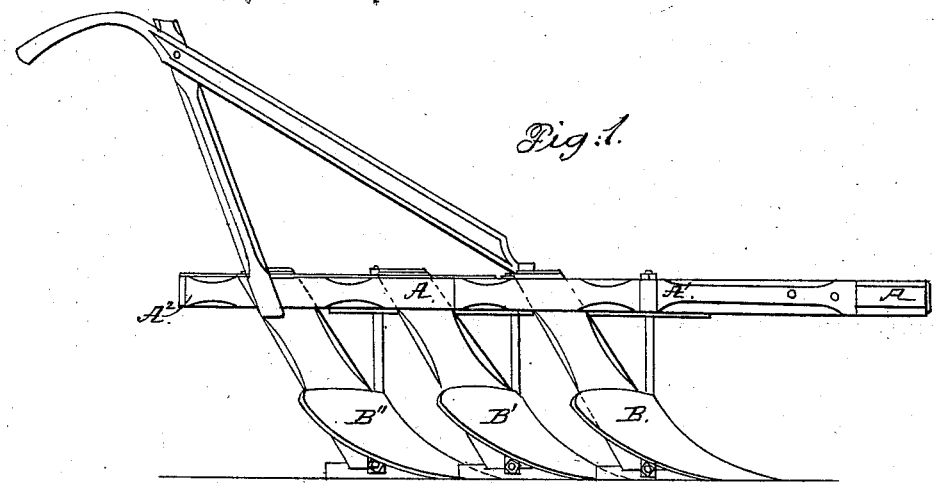

Figure 1 of the drawings is a side elevation of the improved plough.

Figure 2:
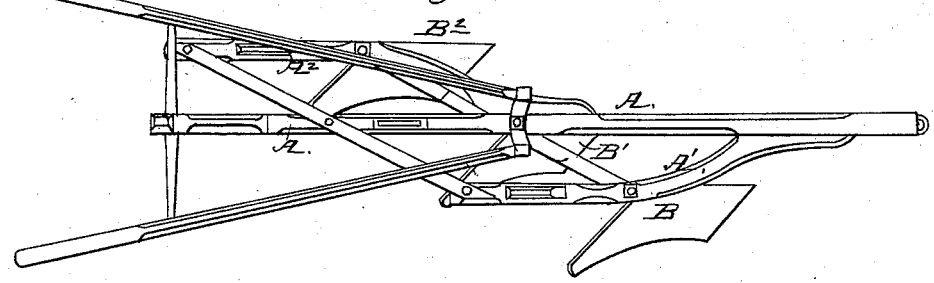

Figure 2 is a plan of it.

A is a central plough-beam, much in the same form and pattern as the old plough-beams of single ploughs. To the sides of this beam there are two others attached. These are represented in the drawings by $A^1$ and $A^2$. The ploughs B $B^1$ $B^2$ are secured to the said beams in the usual manner, and in such positions that the plough B is more advanced than the others, and nearer to the furrow, and so has to turn the first furrow. The plough $B^1$ is placed just far enough behind the plough B, and to the land-side of it, to turn another furrow, so as to clear the first plough, and the location of plough $B^2$ bears the same reference to $B^1$ that $B^1$ does to B, and thus three furrows are turned at every trip of the ploughs.

The advantages are cheapness and lightness of draught.

What I claim, is—

The combination and arrangement of the ploughs B, $B^1$, and $B^2$ with the beams A, $A^1$, and $A^2$, as described and set forth.

GEORGE T. BREWER.

Witnesses:
M. RANDOLPH,
CHAS. H. BOYLE.